Patented Mar. 26, 1929.

1,706,760

UNITED STATES PATENT OFFICE.

HENRY J. WHITE, OF NEW YORK, N. Y., ASSIGNOR TO BETHLEHEM MILLING COMPANY, A CORPORATION OF DELAWARE.

PROCESS OF TREATING GRAIN.

No Drawing. Application filed February 25, 1927. Serial No. 171,080.

This invention relates to improvements in processes of treating wheat and other grains,—one object of the invention being to so treat a wheat kernel or part thereof that it will produce flour with the use of which bread can be produced having a maximum absorption quality and give a loaf of maximum volume.

A further object is to provide a wheat treating process in which oxidation of the fat in the germ of the wheat berry will be prevented and thus prevent the flour made from the wheat from becoming rancid and the baked bread from being soggy.

With these and other objects in view the invention consists in certain steps in the treatment of grain as hereinafter set forth and pointed out in the claims.

In carrying out my improved process, I take the wheat kernel or any part of it and mix with it approximately one and one-half (1½) per cent of carbonate of potash, preferably in solution, and with this is mixed approximately five (5) per cent of sugar. The mixture of wheat kernels or particles, carbonate of potash and sugar is placed in a furnace or container and suitably agitated. While the mixture is in the furnace I discharge into the furnace air heated to approximately four hundred (400°) F. charged with approximately ten per cent (10%) volume of carbonic acid gas. The duration of this treatment will depend upon the kind of wheat or parts thereof to be treated. A spring wheat should be treated for a longer period than a winter wheat. For spring wheat the temperature above specified will give good results, and the duration of treatment may be approximately twenty minutes.

The carbonate of potash as used in my process acts to prevent oxidation of the fat in the germ of the wheat berry and thus liability to rancidity of the flour will be reduced. The sugar will assist the potash in bringing about this result and the addition of carbonic acid gas with heated air will further guard against the possibility of rancidity of the flour. The carbonic acid will assist in preventing oxidation and it will augment the carbonic acid present during the baking of the bread, and result in the formation of a larger and spongy loaf.

The hot air will partially cook the flaky material of the beforementioned mixture. That is to say, the hot air will roast the exterior portions of the flakes. By thus roasting or partially cooking the material, an aroma is produced which is imparted to the material with which it is mixed. Furthermore a laxative property will be imparted to the bread made from the flour.

In carrying out my process I treat the fatty material or germ and not the starch or endosperm of the berry.

I may treat that portion of the wheat which has heretofore been discarded; viz, the refuse of wheat with a small percentage of bran left thereon. The material, after the treatment hereinbefore described, may be mixed with white flour and a combination white bread made therefrom.

Having fully described my invention what I claim as new and desire to secure by Letters-Patent, is:—

1. The process of treating grain particles, consisting in mixing carbonate of potash with the grain particles in the presence of heat.

2. The process of treating grain particles, consisting in mixing carbonate of potash and sugar with the grain particles in the presence of heat.

3. The process of treating grain particles, consisting in mixing carbonate of potash with the grain particles and subjecting the mixture to heat and carbonic acid gas.

4. The process of treating wheat kernels which consists in agitating the kernels in a solution of carbonate of potash and sugar, and then discharging upon the agitated mixture currents of air having a temperature of about 400° F. and charged with carbonic acid gas.

In testimony whereof, I have signed this specification.

HENRY J. WHITE.